United States Patent [19]

Hazebrook et al.

[11] Patent Number: 4,511,346
[45] Date of Patent: Apr. 16, 1985

[54] CONSTANT VELOCITY UNIVERSAL JOINT

[75] Inventors: Daniel W. Hazebrook, Detroit; Glenn F. Gehrke, Brighton; Michael J. Schmidt, Grosse Pointe Park, all of Mich.

[73] Assignee: GKN Automotive Components, Inc., Southfield, Mich.

[21] Appl. No.: 455,783

[22] Filed: Jan. 5, 1983

Related U.S. Application Data

[62] Division of Ser. No. 183,757, Sep. 3, 1980, abandoned.

[51] Int. Cl.$^3$ .............................................. F16D 3/02
[52] U.S. Cl. ................................... 464/146; 464/906
[58] Field of Search ................ 464/140, 146, 906, 145

[56] References Cited

U.S. PATENT DOCUMENTS

| | | | |
|---|---|---|---|
| 2,046,584 | 7/1936 | Rzeppa | 464/146 X |
| 3,218,827 | 11/1965 | Aucktor | 464/146 |
| 3,442,095 | 5/1969 | Devos | 464/146 X |
| 3,464,232 | 9/1969 | Hutchinson | 464/146 |
| 3,603,111 | 9/1971 | Aucktor et al. | 464/146 |
| 4,000,629 | 1/1977 | Bellomo | 464/906 X |
| 4,004,435 | 1/1977 | Rubin | 464/146 X |
| 4,054,039 | 10/1977 | Takahashi et al. | 464/146 |
| 4,068,499 | 1/1978 | Sharp | 464/113 X |
| 4,385,899 | 5/1983 | Franklin, Jr. | 464/146 |

Primary Examiner—Stuart S. Levy
Assistant Examiner—Daniel P. Stodola
Attorney, Agent, or Firm—Remy J. VanOphem

[57] ABSTRACT

A constant velocity torque transmitting universal joint, utilizing spherical ball members arranged in a longitudinal groove of an inner joint member, is adapted to connect to a shaft and a longitudinal groove of an outer joint member. The outer joint member is connected to a second shaft so that the outer joint member may be displaced in an axial direction relative to the inner joint member. Therefore, the inner joint member may be displaced in an axial direction relative to the cage restraining member holding the spherical ball members in their mutually opposed grooves of their respective joint members. The cage restraining member permits the spherical ball members to roll in their respective grooves for a short distance prior to skidding to reduce the overall resistance to axial movement effort prior to skidding as a result of the friction torque relationship of the joint. This is accomplished by providing a relatively flat or cylindrical surface on the outer periphery of the inner body member for a relatively short axial portion and blending appropriate spherical radii with the surface in order to provide sufficient clearance between the inner joint member and the inner surface of the cage. By providing this relatively flat portion to the outer surface of the inner body member, the start of the displacement of the spherical ball members with respect to the outer joint member is considerably facilitated since the spherical ball members can roll in their respective longitudinal grooves prior to skidding.

2 Claims, 5 Drawing Figures

CONSTANT VELOCITY UNIVERSAL JOINT

This is a division, of application Ser. No. 183,757, filed Sept. 3, 1980, now abondoned.

BACKGROUND OF THE INVENTION

1. Field of the Invention

The invention relates generally to a front wheel universal joint drive system used in automotive applications and, more specifically, to a constant velocity torque transmitting universal joint.

2. Description of the Prior Art

The present invention has particular application in a known front wheel drive system wherein the engine transfers power through a transmission to the front wheels. As the vehicle operates, the wheels move up and down in a plane approximately normal to the driving surface. Therefore, provisions must be made in the drive joints to accommodate changes in axial movement between the transmission and the wheel in order to permit free up and down movement of the wheel relative to the transmission and movement relative to the driving surface. Further, the known drive joints must also be able to accommodate axial movements due to vibration of the engine relative to the road wheel when the vehicle is operated as well as when the vehicle is stopped at a traffic signal under heavy load, i.e., air conditioner operating, brakes applied, and torque applied to road wheels by the automatic transmission. Under these conditions, it is typical for the engine to shake and, therefore, the drive joints must be able to accommodate the axial movement of the engine relative to the wheel.

The prior art offers several universal joints which are capable of accommodating relative axial movement of the engine and wheels as described above. U.S. Pat. Nos. 3,442,095, 3,464,232, 3,125,870 as well as 3,218,827, owned by the assignee of the present invention, described herein, are but a few examples. Generally, the arrangement of joints in a front wheel drive system of an automobile utilizes outboard joints of the non-axial travel type and inboard joints of the axial travel type. Presumably, this is because those working in the automotive art have not been able to devise axial travel type universal joints which would permit sufficient angularity to be used as the outboard or steering joint. Accordingly, universal joints of the constant velocity type which are capable of accommodating axial travel, i.e., relative axial movement of inner and outer drive members of the joint, are mounted to the engine or transmission of the engine and, universal joints of the constant velocity type which are not capable of accommodating axial travel or "plunge" are mounted to the wheels of the vehicle. The drive shaft angularity imposed as a result of jounce and rebound of the suspension is accomodated by both joints.

A known form of a constant velocity universal joint of the type referred to above is described in U.S. Pat. No. 3,442,095. Typically, such a joint consists of an annular outer joint member having grooves on its inner surface parallel with the axis of the joint. An inner joint member is positioned within the outer joint member and is provided with grooves on its outer surface to form pairs of opposed grooves with the grooves on the outer joint member. A ball is positioned in every pair of opposed grooves and a ball restraining member or cage disposed between the two joint members retains the balls in a plane perpendicular to the axis of the cage when the joints are in a neutral position. The cage is guided within the outer joint member by a spherical surface on the outer surface of the cage and is guided with respect to the inner joint member by a spherical surface on the inner surface of the cage. The centers of the inner and outer spherical surfaces of the cage are equidistant on opposite sides of the plane passing through the centers of the balls. A control surface is integral with the inner joint member and is provided with a spherical surface for coaction with the inner spherical surface of the cage.

In this type of universal joint, the inner joint member is either provided with a spherical surface or includes a spherical portion on which a coacting spherical surface of the ball retainer cage is guided. When the universal joint is to function as a fixed or non-axial travel type joint wherein the inner and outer joint members move only angularly with respect to each other, then the outer joint member is provided, on its inner surface, with a spherical surface in which the outer spherical surface of the cage is guided. If it is desired to have the universal joint function an an axial travel type or "plunging" joint wherein the joint members cannot only move angularly with respect to each other but also be displaced in an axial direction, then the outer spherical surface of the cage is guided on a cylindrical surface formed on the inner surface of the outer joint member.

As a result of the centers of the inner and outer spherical surfaces of the cage being equidistant on opposite sides of the plane passing through the center of the balls, during joint articulation through a predetermined angle, the inner joint member, in effect, pivots around the offset center of the inner surface of the cage while the outer joint member pivots around the offset center of the outer surface of the cage. As the cage in constrained within the outer joint member, the center of the outer joint member surface must always lie on the joint axis. In addition, the equal offset of the centers of the inner and outer spherical surfaces of the cage insures that the plane of the ball centers articulates accurately through one half of a predetermined joint angle, thus maintaining constant velocity characteristics. During articulation through a predetermined joint angle, the center of the inner surface of the cage moves off the joint axis resulting in the establishment of a new ball center plane displaced slightly from the theoretical joint plane center, i.e., the center at zero joint angle, resulting in a very small axial displacement of the joint center thereby requiring some axial movement of the cage with respect to the outer joint member. Accordingly, there is no tendency to jam and the geometry is such that the cage inner and outer surface centers always reamain equally offset from the instantaneous joint center which passes through the center of the balls. Hence, the plane of the ball centers must always be the true median plane of the joint.

In this known constant velocity torque transmission joint wherein the cage is supported on its outer surface within the inner surface of the outer joint member and on its inner surface on the outer surface of the inner joint member, the manufacturing tolerances or clearances in the components generally cause a slight displacement or shift of the balls out of the true homokinetic plane. The balls are subjected to forces arising from play in the joint resulting from these manufacturing tolerances. These forces tend to displace the ball members out of the theoretical homokinetic plane of operation and have the overall effect of reducing the angle between the ball plane and the axis of the inner joint member. A man skilled in the art recognizing this problem readily realizes that, in order to to avoid this problem, it is necessary to shrink the tolerances down to the limit of manufacturing capabilities and make the relationship of the inner joint member, cage, as well as the outer joint member fit as closely as practically possible. In other words, the closer the fit of the joint member, the more precisely the joint would operate according to the theoretical geometry discussed above.

The net effect of the very rigidly controlled tolerances, which were required in order to insure operational characteristics as discussed above, is that under torque, the actual joint experienced a ball friction torque relationship of skidding steel on steel. The is an accepted condition in the current prior art in order to insure that the joint operated as closely as possible to the theoretical geometric criteria set forth above. Consequentially, under specific road load conditions, there is a certain built-in reistance to axial movement of the cage and inner joint member with respect to the outer joint member, that is acceptable in consideration of this geometric criteria. Naturally, under operating conditions of the vehicle, the resistance to axial movement or resistance to "plunge" is fairly high and the net effect of this resistance, is that, between engine movement and engine shake, as well as wheel movement, there is a certain stiff-arming effect on both joints in a front wheel drive system. This stiff-arming effect or resistance to "plunge" transmits noise and vibration back into the vehicle and is detectable by the driver of the vehicle. This is noticed mostly in a harshness and/or vibration of the vehicle itself. In some vehicles, this is a very noticeable characteristic at low speed and light acceleration up to 20 miles an hour. The whole vehicle feels as if it wants to "waddle", i.e., defined by those in the art as a front wheel stiff-arming effect wherein the drive shaft stiffens and instead of the vehicle experiencing a vibration, the whole body of the vehicle is caused to rock from side to side.

The description of the present invention which follows is directed to the solution of this specific vehicle problem.

SUMMARY OF THE INVENTION

The invention is a constant velocity univeral joint wherein torque is transmitted by means of balls which are guided between mutually opposed longitudinal extending grooves of the inner and outer joint member. The grooves are parallel to the axis of the inner and outer joint members. A cage or restraining member is positioned between the joint members and has openings therein to retain the balls in the plane which is perpendicular to the axis of the cage. The cage has a first spherical surface on its outer face and is guided in a cylindrically shaped inner surface in the bore of the outer joint member. The cage is also provided with an inner contoured surface which is guided upon a correspondingly shaped contoured outer surface of the inner joint member. The mutually opposed inner surface of the cage and outer surface of the inner joint member have means providing for a predetermined axial displacement between the inner joint member and the cage restraining the ball members. Thus, the invention overcomes the disadvantages of the prior art, in that, the drive joint incorporates a second axial displacement of the inner joint member with respect to the cage, the first being the axial displacement of the outer surface of the cage with respect to the inner surface of the outer joint member.

Accordingly, it is a principal object of this invention to provide an improved constant velocity universal joint for torque transmission by means of balls arranged to move in a longitudinal groove of an inner joint member which is adapted to connect to a shaft and a longitudinal groove of an outer joint member which is adapted to be connected to a second shaft, so that the outer joint member may be displaced in an axial direction relative to the inner joint member and further so that the inner joint member may be displaced in an axial direction relative to the cage restraining member holding the balls in the mutually opposed grooves of the respective joint members.

A further object of the invention is to reduce the resistance to axial movement of the inner joint member with respect to the outer joint member by providing axial movement between the inner joint member and the cage restraining member thereby reducing the effect of small road oscillations and engine vibrations to reflect back into the vehicle while, at the same time, maintaining the torsional characteristics of the drive joints.

A further object of the invention is to provide a constant velocity joint in which a secondary axial movement of the inner joint member with respect to the cage restraining member permits the balls to roll in their respective longitudinal grooves for a short distance to significantly reduce the overall resistance to axial movement effort prior to skidding as a result of the friction torque relationship of the joint.

It is a further object of the present invention to provide a constant velocity universal joint which reduces the stiff-arming effect on an automotive vehicle by providing axial movement of the inner joint member with respect to the cage restraining member and thereby reduce the resistance to axial movement under load.

It is yet a further object of the present invention to provide a constant velocity universal joint which permits movement of the inner joint member with respect to the cage restraining member to reduce the stiff-arming effect on an automotive vehicle without any adverse effect on the geometry of a homokinetic constant velocity joint.

It is yet a further object of the present invention to provide a constant velocity joint which significantly reduces "waddle" (i.e., defined by those in the art as a front wheel stiff-arming effect wherein the drive shaft stiffens and instead of the vehicle experiencing a vibration, the whole body of the vehicle is caused to rock from side to side) while at the same time maintaining the torsional characteristics of the constant velocity joint.

It is yet another object of the present invention to provide a constant velocity joint which is simple to construct, easy to assemble, yet inexpensive and durable.

Other and further objects of this invention will become apparent to those skilled in the art from the following detailed description when taken in conjunction with the accompanying drawings.

DETAILED DESCRIPTION OF THE PREFERRED EMBODIMENT

Figure 1:
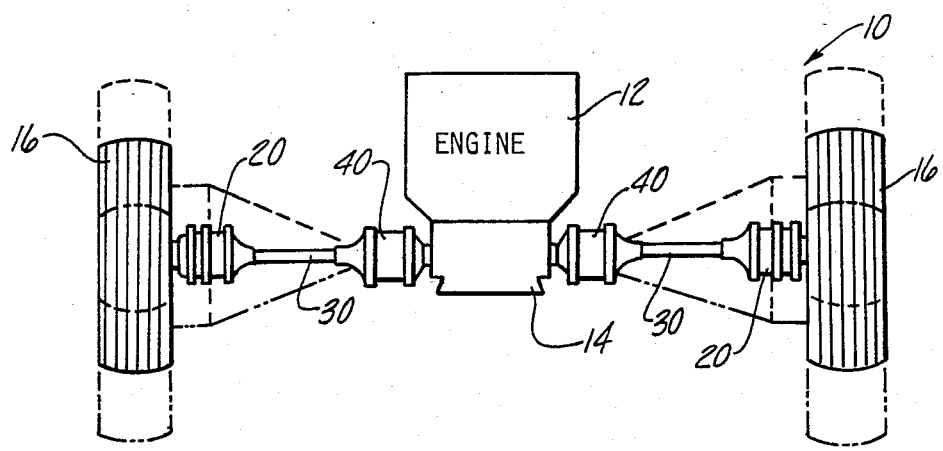
FIG. 1 is a schematic front elevational view of a front wheel drive system for an automotive vehicle utilizing constant velocity universal joints according to the present invention.

Referring to the drawings in particular, FIG. 1 illustrates an automotive front wheel drive system, generally designated by the reference character 10. The drive system includes, generally, a pair of non-axial travel universal joints 20 used as the outboard joints of the drive system and a pair of axial-travel universal joints 40 utilized as the inboard joints of the drive system. The inboard joints receive the driving torque from an automobile engine 12 and a transmission system 14 which are connected to two inboard joints 40 through differential drive gearing of any conventional design (not shown). Each of the outboard joints 20 is connected to an inboard joint 40 by a rigid shaft section 30. In turn, the inboard joints 40 are rigidly connected in any suitable manner to the transmission while the outboard joints 20 are rigidly connected in any suitable manner to the front steerable driving wheels 16 of an automobile or other automotive vehicle.

As is well understood in the automotive art, differential gearing of the automobile engine, transmission and final drive systems are carried by the frame of the automobile (not shown). The driving wheels 16 ride on a roadway surface and are associated with the frame of the automobile through suitable springs and shock absorbers (not shown).

When an automobile incorporating a front wheel drive system 10 is driven on a road or highway, the driving wheels 16 ride on the surface of the roadway. Torque from the automobile engine 12 is transmitted through a transmission system 14 thence through the differential gearing to the driving wheels. As the automobile rounds a curve or turns a corner, the differential gearing permits the outside wheel on the curve to travel faster, and when the automobile is driven straight ahead, the wheels travel at the same rate of speed, all in a conventional manner.

While the front steerable driving wheels 16 of the front wheel drive system 10 are being driven and steered, the suspension system of the vehicle accommodates unevenness in the roadway by permitting the wheels to move up and down in jounce and rebound. In FIG. 1, which is a front view of the front wheel drive system 10, it is illustrated with dotted lines, how the driving wheels 16 may move up and down by requiring the inboard joints 40 and the outboard joints 20 to accommodate approximately 20 degrees of jounce and 20 degrees of rebound from the central neutral position shown in solid lines. As this occurs, the axial distances between the respective inboard joints 40 and outboard joints 20 must change. Hence, at least one of the joints on each side of the vehicle must be able to accommodate relative axial shifting, or else a conventional slip spline must be utilized somewhere in each shaft connecting the joints. FIG. 1 illustrates the most stringent condition, that in which the suspension causes the wheels to travel straight up and down in jounce and rebound, so that the shaft angularity imposed must be accommodated in both joints. Many, if not most, automobiles permit the wheels to cant at least partly so that the angularity imposed is less, at least at the outboard joint.

The inboard joints 40 are of the axial shift type and can thus accommodate the axial distance difference as the driving wheels travel in jounce and rebound. The outboard joints 20 may thus be of the non-axial travel type.

Figure 2:
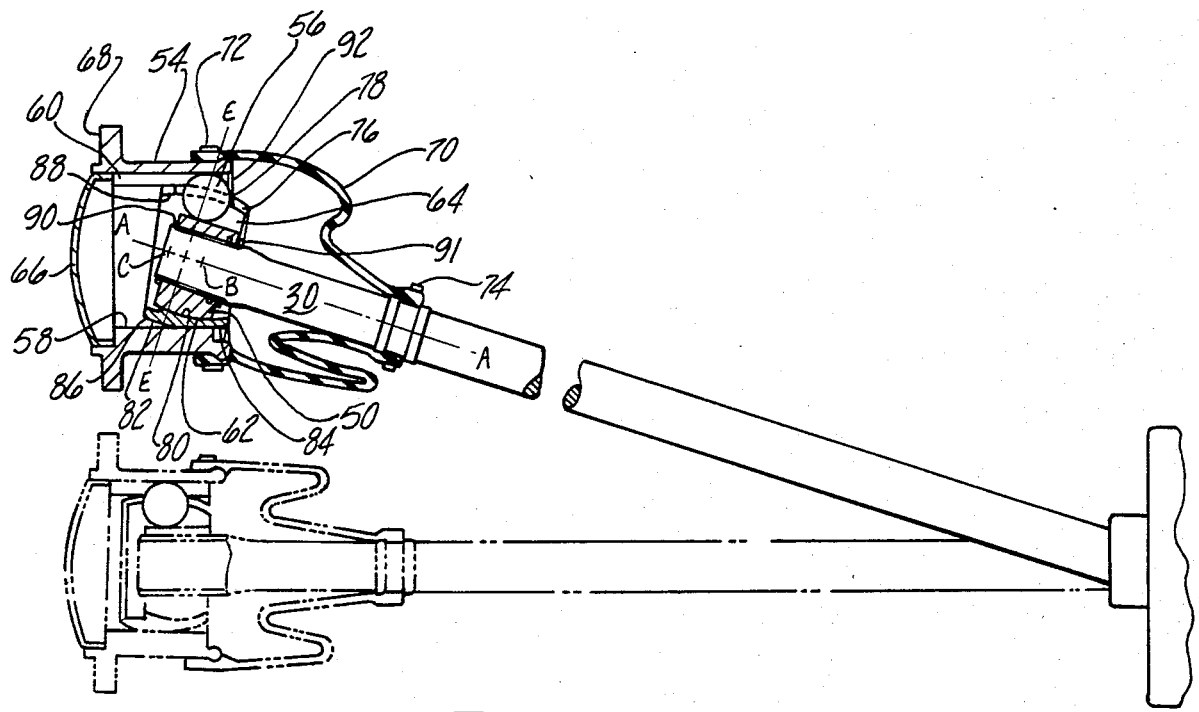
FIG. 2 is a fragmentary sectional view showing a prior art front wheel drive in neutral and maximum jounce or rebound position to illustrate the requirement of providing axial movement within the drive joints to permit approximate straight up and down movement of the front wheel.

FIG. 2 illustrates a prior art constant velocity universal joint and includes an inner joint member 50 rotatably and axially movable within a hollow, generally cylindrical, outer joint member 54 and coupled therein to a series of equiangularly spaced torque transmitting balls 56. The sectioning of the joint is taken in different radial planes above and below the joint axis A—A in order to show below that axis the sectional form of the joint components between adjacent torque transmitting balls 56.

The outer joint member 54 has a cylindrical through bore 58 with longitudinally extending grooves 60 parallel to the central axis A—A of the outer joint member 54 which coincides with the joint axis A—A. The inner joint member 50 has a spherical outer surface 62 with straight grooves 64 similarly disposed about its outer periphery; the grooves being parallel to the rotational axis of the inner member, which again coincides with the central axis A—A of the joint in the zero angle condition shown. The grooves 60, 64 in the two joint members cooperate in pairs to provide ball tracks along which the torque transmitting balls 56 move during joint articulation and axial plunge.

One end of the outer joint member 54 is closed by a plate 66 and adjacent that end there is provided an external peripheral flange 68 adapted to be bolted to a drive shaft (not shown) of the transmission. The inner joint member 50 has a spline connection with the rigid shaft section 30 which projects from the opposite end of the outer joint member 54. The latter end is closed by a flexible rubber boot 70 clamped at one end to the outer joint member 54 by a retaining ring 72 and at the other end to the projecting drive shaft 30 by a second retaining ring 74.

A ball restraining member or cage 76 with apertures 78 in which the balls 56 are closely received is positioned between the inner joint member 50 and outer joint member 54 and acts to center the inner joint member 50 within the outer joint member 54. The cage 76 has an inner spherical surface 80 which mates with the complementary spherical outer surface 62 of the inner joint member 50 so that the cage 76 not only centers the inner joint member but is held captive thereon in an axial sense. The cage 76 also has a part-spherical outer surface portion 82 adjacent one end and this surface engages the cylindrical through bore 58 of the outer joint member 54.

Figure 4:
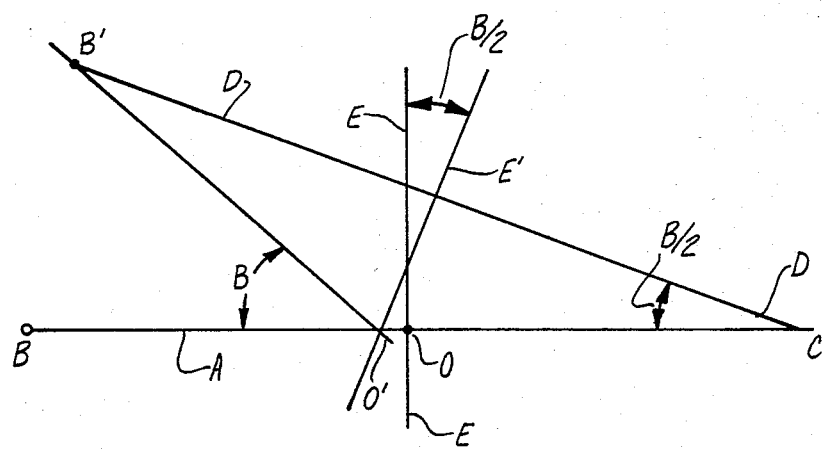
FIG. 4 is a diagram illustrating the geometry of a constant velocity universal joint of the axial travel type.

Referring now to FIGS. 2 and 4 there is illustrated the geometry at zero angle and at a joint angle B, the inner spherical surface 80 of the cage 76 is centered about a point B on the joint axis A—A which is displaced from the joint center O, (i.e., the point at which the plane containing the ball centers intersect the joint axis), toward the side of the joint from which the drive shaft 30 projects or driving from the side of the joint from which the drive shaft 30 projects. The part-spherical outer surface 82 of the cage 76 is centered on a point C which is also disposed on the joint axis A—A but is offset from the joint center O by an equal amount in the opposite direction, considering conditions at zero joint angle.

As a result of the offset of the centers of the inner and outer cage surfaces, during joint articulation, through an angle B, the inner joint member 50 in effect pivots around the offset center B of the inner spherical surface 80 of the cage 76 and the outer joint member 54 pivots around the offset center C of the part-spherical outer surface 82 of the cage 76. As the cage 76 is constrained within the outer joint member 54, the center C of the part-spherical outer surface 82 of the cage 76 must always lie on the outer member axis A—A, and the equal offset of the centers B and C insures that the plane E—E of the ball centers articulates accurately through half the joint angle, i.e., an angle of B/2, thus maintaining constant velocity characteristics. The center of the inner spherical surface 80 of the cage 76 moves off the joint axis A—A to the point B', and the point at which joint axis A—A intersects the new ball center plane E'—E' is displaced slightly from the theoretical joint center O, i.e., the center at zero joint angle, to the position O'. This displacement is, however, very small and is accommodated by axial movement of the cage 76 with respect to the outer joint member 54. Thus, there is no tendency to jam and the geometry is such that the cage surface centers B and C always remain equally offset from the instantaneous joint center O'. Hence, the plane of the ball centers must always be the true median plane of the universal joint. The axis of the cage in the articulated condition is indicated by line D—D.

From the above description, it is readily understood that manufacturing tolerances or clearances in the components can cause a slight displacement or shift of the balls out of the true homokinetic plane. The balls are subjected to forces arising from play in the joint due to these tolerances and it is these forces which tend to displace the balls out of the theoretical homokinetic plane of operation and have the overall effect of reducing the ball angle between the ball plane and the axis of the inner joint member. Because of this geometric relationship, it has always been felt necessary in the prior art that the manufacturing tolerances needed to be minimized and, in fact, reduced to the limit of manufacturing capabilities in order to establish a relationship between the inner joint member, cage, as well as the outer joint member to maintain the geometry described above and thereby obtain proper operational characteristics. The effect of the very rigidly controlled tolerances, which were required in order to insure high speed operational characteristics as discussed above, is that under load conditions in the vehicle, during articulation, the constant velocity universal joint experienced a ball friction torque relationship of skidding the balls in the grooves. This is an accepted condition in the prior art in order to insure that the joint operated as closely as possible to the theoretical geometry criteria set forth above. Consequentially, those in the prior art are willing to accept that under specific road conditions, there is a certain built-in resistance to axial movement of the cage and inner joint member with respect to the outer joint member that is considered acceptable in consideration of this geometric criteria. This resistance to axial movement or resistance to "plunge" is fairly high and the net effect of this resistance, is that, between engine movement and engine shake, as well as wheel movement, there is a certain stiff-arming effect on both joints in the front wheel drive system. This stiff-arming effect or resistance to "plunge" generates noise and vibration back into the vehicle and is detectable by the driver of the vehicle. It is noted mostly as a harshness and/or vibration of the vehicle itself. In some vehicles, this is a very noticeable characteristic at low speed and light acceleration up to 20 miles an hour. In fact, in this operational condition, it has been experienced that the complete vehicle waddles or rocks from side to side because of the high resistance to axial movement of the inner manner and cage with respect to the outer member.

Referring again to FIGS. 1 and 2, the joints of the axial travel or plunging type, experience a maximum working angle of approximately 20 degrees which is considered normally ample, and as the cage 76 moves through only half the joint angle, the part-spherical outer surface portion 82 need only subtend an angle of approximately 10 degrees at the joint center. The one end of the outer surface portion 86 of the retaining cage is frusto-conically formed tangential to the part-spherical outer surface portion 82. This allows the cage 76 to be of much stronger construction and thicker at the end near the open end of the joint than if the outer surface was completely spherical. The other end outer surface portion 84 is part-spherical. The frusto-conical surface 86 and the part-spherical surface 84 are arranged so that they engage the cylindrical through bore 58 to provide a positive stop against overangling of the joint.

An appropriate counter bore 88 allows assembly of the inner joint member to the cage while appropriate retainer means 90, 91 on each side of the inner joint member retain the inner joint member 50 on to the drive shaft 30. Retainer means 92 are placed near the open end of the outer joint member to retain the cage, balls and inner joint member assembly captive within the outer joint member.

Figure 3:
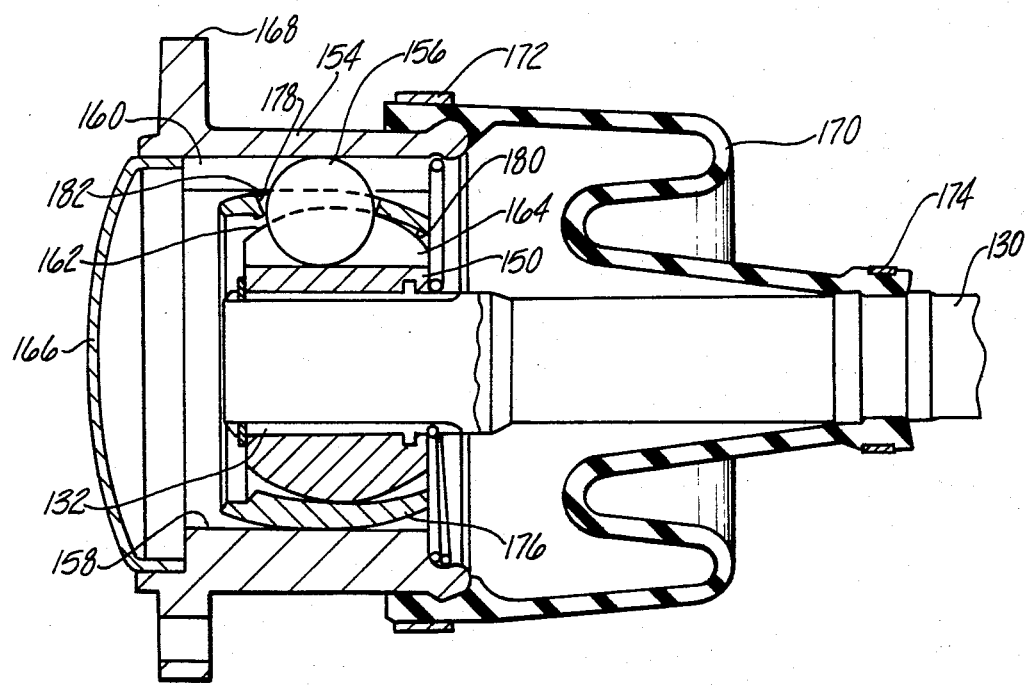
FIG. 3 is a longitudnal section of a constant velocity universal joint constructed in accordance with the invention.

FIG. 3 illustrates the joint of the present invention. The sectioning of the joint is taken in different radial planes above and below the joint axis A—A in order to show, below that axis, the sectional form of the joint components between adjacent ball members 156. The interengaging surfaces of the inner joint member 150, that is, outer surface 162 with respect to the inner surface 180 of the cage retaining member 176 are enlarged to show the inventive concept. The inner joint member 150 is held on a shaft 130 for rotation with the shaft by means of a spline 132. A flange (not shown) is radially disposed with respect to a second shaft to connect the outer joint member 154 to the transmission gearing 14 shown in FIG. 1. The shaft 130 is connected to the outboard non-axial travel type constant velocity joint which in turn is connected to the wheel.

The outer joint member 154 has a cylindrical inner surface 158 into which are formed longitudinal grooves 160 which are parallel to the axis of the outer joint member 154. The outer most portion of the inner joint member 150 is also provided with longitudinally extending grooves 164 which also extend parallel to the axis of the inner joint member 150. A plurality of ball members 156 are arranged so that they are confined in their radially opposed grooves 160, 164. The balls 156 transmit torque from one shaft to the other through the walls of the inner joint member or body 150 and the outer joint member or body 154 which are adjacent their respective grooves 160 and 164.

One end of the outer joint member 154 is closed by a plate 166 and adjacent that end there is provided an external peripheral flange 168 mounted on a drive shaft (not shown) of the transmission 14 shown in FIG. 1. The inner joint member 150 has a spline connection with the drive shaft 130 which projects from the opposite end of the outer joint member 154. The latter end is closed by a flexible rubber boot 170 clamped at one end to the outer joint member 154 by a retaining ring 172 and at the outer end to the projecting drive shaft 130 by a second retaining ring 174.

A ball restraining member or cage 176 with apertures 178 in which the spherical balls 156 are closely received is positioned between the inner joint member 150 and the outer joint member 154 and acts to center the inner joint member 150 within the outer joint member 154. The cage member 176 has an inner spherical surface 180 which is guided inwardly by means of its inner spherical surface which mates with the outer surface 162 of the inner joint member 150. A cage 176 also has a part-spherical outer surface portion 182 adjacent one end and this surface engages the cylindrical bore 158 of the outer joint member 154.

In order to accomplish the objectives of this invention, that is, providing a second axial movement of the inner joint member with respect to the outer joint member, it is necessary to provide for looser tolerances between the inner body member 150 and the cage member 176. This is accomplished by designing a relatively flat or cylindrical surface on the outer periphery of the inner body member for a relatively short axial portion and blending appropriate spherical radii with the surface in order to provide sufficient clearance between the inner body member and the inner surface of the cage. This permits the inner body member to move a predetermined distance axially with respect to the cage prior to the cage moving axially with respect to the outer body member. By providing this relatively flat portion on the outer surface 162 of the inner body member 150, the start of the displacement of the spherical balls 156 with respect to the outer member 154 is considerably facilitated since now the spherical ball members 156 can roll in the grooves 160, 164 prior to acquiring the skidding relationship as described above. By providing the initial movement of the rolling of the balls 156 within the grooves 160, 164, the stiff-arming effect of the complete constant velocity drive is reduced significantly with an immediate and noticeable improvement of the drive of the vehicle. This second axial travel or plunge characteristic significantly reduces the plunge resistance encountered in prior art designs. By relying on rolling friction of the balls rather than sliding friction in its initial increment of movement, the overall operating characteristic of the joint is freed up to provide some axial freedom to the balls upon initiating its plunging movement. This enables the balls 156 to roll within the grooves 160, 164 for a short distance and thus creates a major improvement in the vehicle ride. Naturally, the torsional capabilities of the joint or the geometric description set forth above are in no way affected by providing this axial movement of the inner body joint member 150 with respect to the cage member 176. The magnitude of the axial movement of the inner joint member 150 with respect to the cage member 176 must be closely controlled in order to avoid affecting the torsional characteristics of the joint. It has been found that a surface of 0.7 to 0.8 millimeters is preferred although, this is dependent on the type of vehicle wherein the drive is to be used. The magnitude of the axial movement may vary from 0.5 millimeters to 1.5 millimeters.

Figure 5:
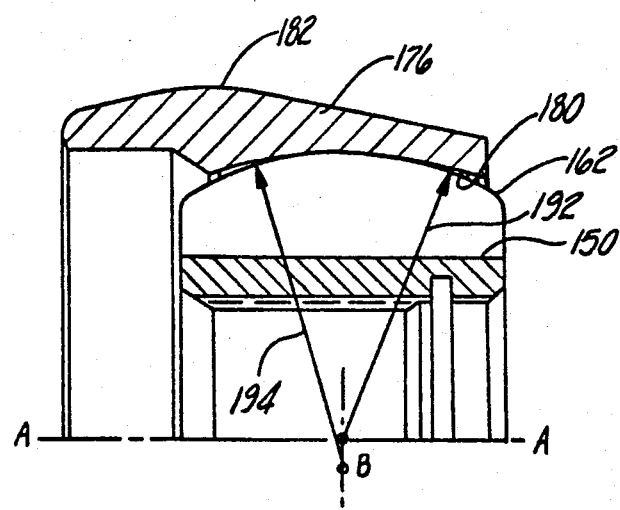
FIG. 5 is a partial sectional view of the inner joint member and cage restraining member which accomplishes the objective of permitting axial travel of the inner joint member with respect to the cage member.

Accordingly, there are several different techniques which may be utilized in order to obtain the axial movement of the inner joint member or body 150 with respect to the cage member 176 according to the invention. In this specification like parts are designated with like numerals throughout. FIG. 5 shows the radius of the outer surface 162 of the inner joint member 150 having a spherical radius 192 with its center on the joint axis A—A and being centered about a point B falling on the joint axis. The cage inner surface 180 also has a spherical radius 194 larger than the spherical radius 192 of the outer surface 162 of the inner joint member 150 and accordingly, falls on the center B of the inner joint member 150 but is centered below the joint axis A—A of the joint. Note, by providing a larger radius 194 for the inner surface of the cage 176 than the spherical radius 192 on the outer surface 162 of the inner joint member 150, there will be established a portion along the center of the inner joint member, that is, for all practical purposes, a flat surface with the two surfaces falling away from each other, either side of this central portion. The relationship of the outer surface 162 of the inner joint member 150 and the inner surface 180 of the cage restraining member 176 allows the inner joint member 150 to move axially with respect to the cage member 176 without interfering with the geometry discussed with reference to FIG. 4 herein set forth above.

The embodiment of the invention shown in FIG. 5 is basically similar to that of FIG. 2, and it has been atttmpted to show corresponding parts by the same reference numerals increased by a factor of 100. The basic difference is that the outer surface of the inner body member, with respect to the inner surface of the cage, is shown with a substantially flat portion in order to enable the inner body member to move axially for a predetermined distance with respect to the cage and thereby significantly reduce a stiff-arming effect of the drive and improve the ride characteristics of the vehicle.

While specific embodiments of the invention have been shown and described in detail to illustrate the application of the inventive principles, it will be understood by those skilled in the art that the invention may be embodied otherwise without departing from such principles.

What is claimed is:

1. A constant velocity universal joint comprising:
   an outer joint member having a cylindrical portion, said cylindrical portion having an axis and a plurality of longitudinal grooves along an inner cylindrical surface;
   an inner joint member coaxially mounted with said outer joint member for cooperation therewith, said inner joint member having an axis common with said axis of said outer joint member and a plurality of longitudinal grooves substantially parallel to said plurality of longitudinal grooves in said outer joint member;
   a plurality of spherical members mounted in said plurality of longitudinal grooves of said inner and outer joint members for transmitting torque between said inner and outer joint members;

an annular restraining member centrally disposed between said inner and outer joint members, said annular restraining member further comprising:

a part-spherical outer surface cooperating with the inner cylindrical surface of said outer joint member; and an inner contoured surface disposed adjacent said part-spherical outer surface, said inner contoured surface and said part-spherical outer surface having portions defining a plurality of apertures interposed said part-spherical outer surface and said inner contoured surface, said plurality of apertures locating said plurality of spherical members in a plane normal to the axis of said annular restraining member, the intersection of said normal plane and said common axis of said inner and outer joint members defining a joint center;

means for providing a limited relative axial movement of said outer joint member relative to said inner joint member as said plurality of spherical members move in said plurality of longitudinal grooves of said inner and outer joint members;

said inner joint member further having an outer contoured surface juxtaposed said inner contoured surface of said annular restraining member;

means defining a first spherical surface on said outer contoured surface of said inner joint member, said first spherical surface defining means having a first radius, said first radius having its center along said common axis and centrally located with said outer contoured surface of said inner joint member; and said inner contoured surface of said annular restraining member having a second radius greater than said first radius, said second radius having its center centrally disposed with said inner contoured surface of said annular restraining member and displaced below said common axis to provide a predetermined clearance between said inner joint member and said inner contoured surface of said annular restraining member whereby when said inner joint member moves axially relative to said outer joint member said inner joint member moves a predetermined axial distance relative to said annular restraining member prior to said annular restraining member moving axially relative to said outer joint member.

2. In a universal joint having inner and outer joint members coaxially mounted along a common joint axis, said inner and outer joint members having longitudinal grooves, spherical ball members in said longitudinal grooves for transferring torque between said inner and outer joint members and a cage member for positioning said spherical ball members in a plane normal to said common axis, said cage member being pivoted on said inner and outer joint members about two respective centers located on said common joint axis, said two respective centers further being on opposite sides of and spaced from the cage center, the improvement comprising:

said inner joint member having an outer contoured surface, said outer contoured surface defined by a first spherical surface having a first spherical radius, said first spherical radius having its center along said common axis and at one of said two respective centers of said cage member; and said cage member having an inner contoured surface, said inner contoured surface being defined by a second radius greater than said first radius, said second radius having its center centrally disposed with said inner contoured surface of said cage member and displaced below said common axis along a plane normal to said common axis and bisecting said one of said two respective centers of said cage member whereby said inner joint member slidably engages said cage member and is movable pivotably and axially a predetermined axial distance between two engaging surface areas along said inner contoured surface of said cage member, said two engaging surface areas being centrally located about said one of said two respective centers such that a clearance exists between said cage member and said inner joint member between said two engaging surfaces of said inner contoured surface of said cage member.

* * * * *

UNITED STATES PATENT AND TRADEMARK OFFICE
CERTIFICATE OF CORRECTION

PATENT NO. : 4,511,346
DATED : April 16, 1985
INVENTOR(S) : Hazebrook, et al.

It is certified that error appears in the above-identified patent and that said Letters Patent is hereby corrected as shown below:

Column 2, line 23, delete "function an an" and insert ---- function as an ----.

Column 2, line 36, delete "cage in" and insert ---- cage is ----.

Column 2, line 53, delete "reamain" and insert ---- remain ----.

Column 5, line 11, delete "type;" and insert ---- type; and ----.

Column 8, line 37, delete "on to" and insert ---- to ----.

Signed and Sealed this

Twelfth Day of November 1985

[SEAL]

Attest:

DONALD J. QUIGG

Attesting Officer

Commissioner of Patents and Trademarks